United States Patent [19]
Cutler et al.

[11] Patent Number: 5,063,497
[45] Date of Patent: Nov. 5, 1991

[54] APPARATUS AND METHOD FOR RECOVERING FROM MISSING PAGE FAULTS IN VECTOR DATA PROCESSING OPERATIONS

[75] Inventors: David N. Cutler, Bellevue; David A. Orbits, Redmond, both of Wash.; Dileep Bhandarkar, Shrewsbury, Mass.; Wayne Cardoza, Merrimack, N.H.; Richard T. Witek, Littleton, Mass.

[73] Assignee: Digital Equipment Corporation, Maynard, Mass.

[21] Appl. No.: 69,372

[22] Filed: Jul. 1, 1987

[51] Int. Cl.⁵ ............................................. G06F 12/00
[52] U.S. Cl. ............................................... 395/800
[58] Field of Search ................................ 364/200, 900

[56] References Cited

U.S. PATENT DOCUMENTS

| | | | |
|---|---|---|---|
| 4,044,337 | 8/1977 | Hicks et al. | 364/200 |
| 4,053,752 | 10/1977 | DeJohn et al. | 235/302.1 |
| 4,079,453 | 3/1978 | Dahl | 364/200 |
| 4,084,236 | 4/1978 | Chelberg et al. | 364/200 |
| 4,228,496 | 10/1980 | Katzman et al. | 364/200 |
| 4,234,918 | 11/1980 | Chu et al. | 364/200 |
| 4,488,228 | 10/1984 | Crudele et al. | 364/200 |
| 4,541,046 | 9/1985 | Nagashima et al. | 364/200 |
| 4,594,682 | 6/1986 | Drimak | 364/900 |
| 4,620,275 | 10/1986 | Wallach et al. | 364/200 |
| 4,706,191 | 11/1987 | Hamstra et al. | 364/200 |
| 4,760,518 | 7/1988 | Potash et al. | 364/200 |
| 4,768,146 | 8/1988 | Nagashima et al. | 364/200 |
| 4,769,770 | 9/1988 | Miyadera et al. | 364/200 |
| 4,771,380 | 9/1988 | Kris | 364/200 |
| 4,812,972 | 3/1989 | Chastain et al. | 364/200 |

*Primary Examiner*—Gareth D. Shaw
*Assistant Examiner*—Maria Napiorkowski
*Attorney, Agent, or Firm*—Fish & Richardson

[57] ABSTRACT

In a data processing system employing virtual memory techniques and capable of performing a plurality of overlapping scalar and vector data processing operations, apparatus and method are provided to allow continuation of program execution after one or more vector load/store instructions, which refer to data values that are not currently in memory, receive page faults. At the occurrence of such a page fault, all instructions currently in execution are allowed to be completed, whereupon information summarizing the page fault condition is recorded in memory for use by the operating system software and a vector exception is generated. Operating system software responds to this exception, examines the fault information, causes the missing pages to be read into the main memory unit from the mass storage media, re-executes the exception producing vector instruction(s) and continues with the program execution.

32 Claims, 4 Drawing Sheets

APPARATUS AND METHOD FOR RECOVERING FROM MISSING PAGE FAULTS IN VECTOR DATA PROCESSING OPERATIONS

RELATED APPLICATIONS

This application is related to the following U.S. Patent Applications.

APPARATUS AND METHOD FOR PROVIDING AN EXTENDED PROCESSING ENVIRONMENT FOR NONMICROCODED DATA PROCESSING SYSTEMS invented by David N. Cutler, David A. Orbits, Dileep Bhandarkar, Wayne Cardoza and Richard T. Witek; having Ser. No. 07/069,365; filed on July 1, 1987, and assigned to the assignee of the present U.S. Patent Application.

APPARATUS AND METHOD FOR MAIN MEMORY UNIT PROTECTION USING ACCESS AND FAULT LOGIC SIGNALS invented by David N. Cutler, David A. Orbits, Dileep Bhandarkar, Wayne Cardoza and Richard T. Witek.; having Ser. No. 07/069,290; filed on July 1, 1987, and assigned to the assignee of the present U.S. Patent Application.

APPARATUS AND METHOD FOR SYNCHRONIZATION OF ACCESS TO MAIN MEMORY SIGNAL GROUPS IN A MULTIPROCESSING UNIT DATA PROCESSING SYSTEM invented by David N. Cutler, David A. Orbits, Dileep Bhandarkar, Wayne Cardoza and Richard T. Witek; having Ser. No. 07/069,380; filed on July 1, 1987, and assigned to the assignee of the present U.S. Patent Application.

BACKGROUND OF THE INVENTION

1. Field of the Invention

This invention relates generally to data processing systems and, more particularly, to data processing systems capable of performing vector operations in a virtual memory environment.

2. Description of the Related Art

In order to increase the performance of certain types of repetitious operations, the technique of vector data processing operations has been developed. For example, a vector add operation can be used to add the corresponding elements of two data arrays together and store the resultant sums in a third array. This procedure can be contrasted with scalar instructions implementing the same computation which would require repeated execution of a loop routine. Vector processing has the advantage of specifying, in a single operation, the processing of large amounts of data without the need to issue multiple instructions or perform loop iteration control. In addition, since the same operation is being applied to each set of operands, pipelining techniques can be efficiently employed to increase performance. In general, two models of vector processing have emerged, the register based model and the memory based model.

In the resister based model, sets of operands are transferred (loaded) from main memory and stored in special registers referred to as vector registers. Each vector register can store a multiplicity of operands, each operand having a predetermined length. When one or more vector registers have the required operands stored therein, then all the operands stored in the vector registers are processed by a common arithmetic operation and the operands resulting from the processing operation are stored in a target vector register. Because the same operation is performed on all the operands of the vector registers, only one instruction need be issued to the processing execution unit to manipulate a multiplicity of operands. After all the requisite operations are performed on the set of operands, the operands are returned to (or stored in) the main memory unit.

In the memory based model, the operands are transferred directly from the main memory unit to the execution unit and the resulting operands are returned directly to the main memory unit. The memory based model theoretically provides higher performance because the information does not have to be stored into vector registers before starting an operation and then returned to memory when the operation is complete. However, when a vector operation is started, a certain amount of time is required before the first operand arrives from memory and therefore the memory based vector model is most efficient when the start up time can be amortized over a very long vector operation.

The vector register based model typically has very short start-up times and therefore has better performance on short vectors. Operands are loaded and stored in parallel with the actual vector operations and therefore the benefit of short start-up times is combined with maximum memory utilization to obtain nearly the same peak vector operation rates that are obtainable on long vector operations in the memory based model.

In modern data processing systems, the use of virtual memory has become so common as to be a requirement of a data processing system. In the virtual of the memory data processing system, the bulk of the logic signal groups required by the processor are stored in bulk storage units (also referred to as the backing store). When instruction and data elements are required by the data processing system, the data processing system anticipates that the requested instruction or data elements are stored in the main memory unit and, therefore, the data processing system attempts to transfer the required instruction or data element from the main memory unit to the portion of the data processing unit requiring the instruction or data element. When the data processing system determines that the requisite instruction or data element is not in the main memory unit, then a page fault is generated, the page being the unit of information stored in mass memory manipulated by the data processing system. The page fault causes data processing system apparatus to store information necessary to respond to the page fault and then transfers control to the operating system to respond to the page fault.

In response to the generation of a page fault, the data processing system will transfer control to an appropriate operating system module that will determine the location of the required instruction or data element, and transfer a "page" of instruction and/or data elements including the requested instruction or data element to the main memory unit. The operating system module will, in addition, create the tables required to relate the main memory address to the position of the requisite instruction or data element in the mass memory media.

In the scalar (nonvector) mode of operation, memory reference instructions are executed sequentially and can access only a single piece of data. When a datum is referenced that is not in main memory, necessary information is stored and a page fault exception is generated. The operating system gains control, reads the necessary page into memory, and then resumes program execution simply by backing up the program counter and continuing the execution of the instruction sequence.

In contrast, a single vector load or store operation can read or write up to the number of data element operands that can be stored in a vector register. While the vector load/store operation is being performed, it is advantageous to continue to issue additional vector and/or scalar instructions. Therefore, unlike the case of a scalar load/store operation, several additional instructions may have been issued after the vector instruction, but before the missing page(s) is (are) encountered. When the required data element is not in the main memory unit, several pieces of information must be preserved in order to restart or complete the execution of the instruction after the missing page has been transferred into the main memory unit.

The performance of the data processing system in performing vector operations can be limited by the memory speed, by how many vector load and store operations can be executed simultaneously, and by how many function or execution units can be operated in parallel performing the vector operations. Clearly, to the extent that multiple overlapping scalar and vector operations can be performed, the efficiency of the data processing system can be improved.

However, the execution of overlapping scalar and vector instructions in the virtual memory environment increases the difficulty of recovering from a page fault (i.e., when required data is not available in the main memory unit) resulting from the vector instruction. In fact, more than one vector operation can potentially have a page fault identified therewith during the completion of the currently executing instructions further complicating restart of the vector processing operations. With scalar load/store operations that reference a single piece of data, a memory management problem is immediately detected and therefore additional instructions are not issued. In order to optimize performance, instructions continue to be issued before a memory management problem can be detected for a vector instruction. The intervening instructions may have altered the state of information that was an operand of the original vector instruction and therefore, retrieval of the missing page, backing-up the program counter and re-executing the instruction may not provide an adequate response to the page fault. A need has therefore been felt for a technique that can permit relatively convenient recovery from page faults or other vector exceptions in a data processing system executing a plurality of overlapping vector operations using a vector register base model.

FEATURES OF THE INVENTION

It is an object of the present invention to provide an improved data processing system.

It is a feature of the present invention to provide a data processing unit capable of improved vector data processing operations.

It is another feature of the present invention to permit recovery from page faults by a central processing unit capable of executing a plurality of overlapping instructions.

It is yet another feature of the present invention to provide a technique for permitting recovery from page faults by a data processing system capable of executing a plurality of overlapping vector and scalar operation instructions.

It is yet another feature of the present invention to provide a technique for recovery from a vector operation induced page fault in a data processing system having a virtual memory capability.

SUMMARY OF THE INVENTION

The aforementioned and other features are accomplished according to the present invention, by providing, in a data processing system having both vector operation capability and virtual memory implementation, apparatus to respond to generation of a vector exception signal (such as a page fault signal) induced by a vector operation instruction. A plurality of (vector) operations, referencing the main memory unit, can be in progress at any instance in time. When a vector exception signal is generated, the issue unit of the central processing unit stops issuing instructions and the instructions in current execution are allowed to continue to completion. When all instructions are completed, the information identifying the virtual memory problem(s) encountered by the respective vector instruction(s) is (are) stored on the kernel stack. The information stored on the kernel stack includes the exception type code identifying the fault, the vector length, the initial base address, the initial stride, the virtual address that caused the virtual memory problem, the vector instruction itself, the current processor status and the virtual address of the next instruction to be issued. (The address of the next instruction is not necessarily for the instruction sequentially following the vector instruction.) This information is sufficient to locate the virtual memory problem. For a page fault, missing pages are transferred into the main memory, the instruction causing the page fault is reexecuted and program execution is continued at the next instruction (the next instruction net necessarily being the one following the vector instruction with the page fault).

These and other features of the present invention will be understood upon reading of the following description along with the drawings.

DESCRIPTION OF THE PREFERRED EMBODIMENT

1. Detailed Description of the Figures

Figure 1A:
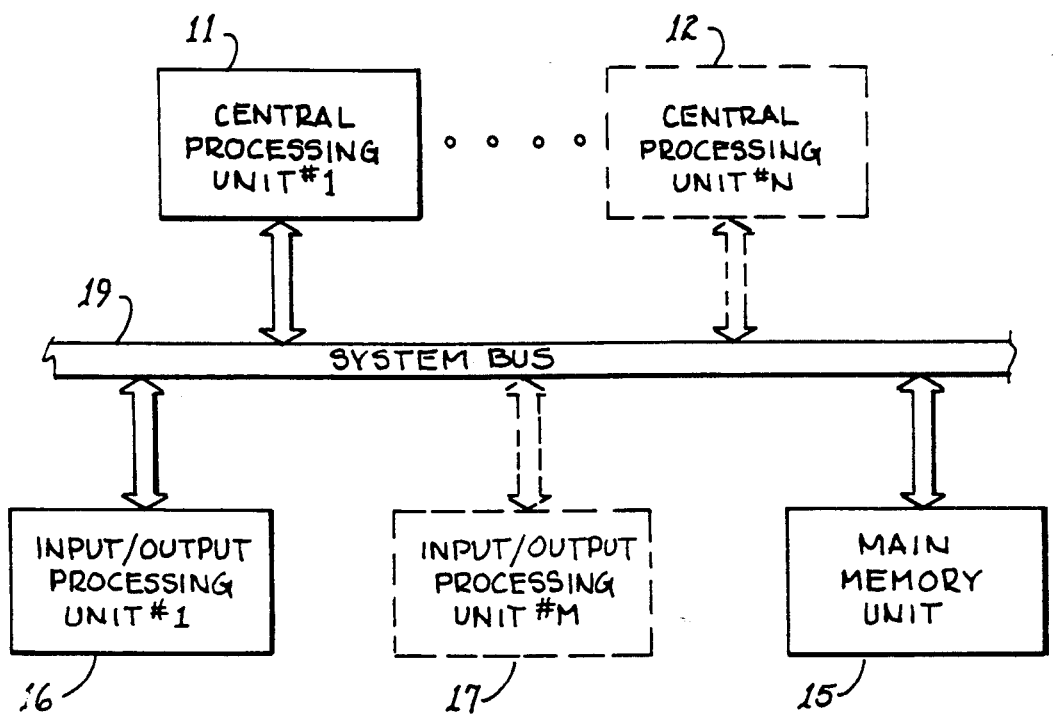
FIG. 1A and FIG. 1B are examples of data processing system implementations capable of utilizing the present invention.
Figure 1B:
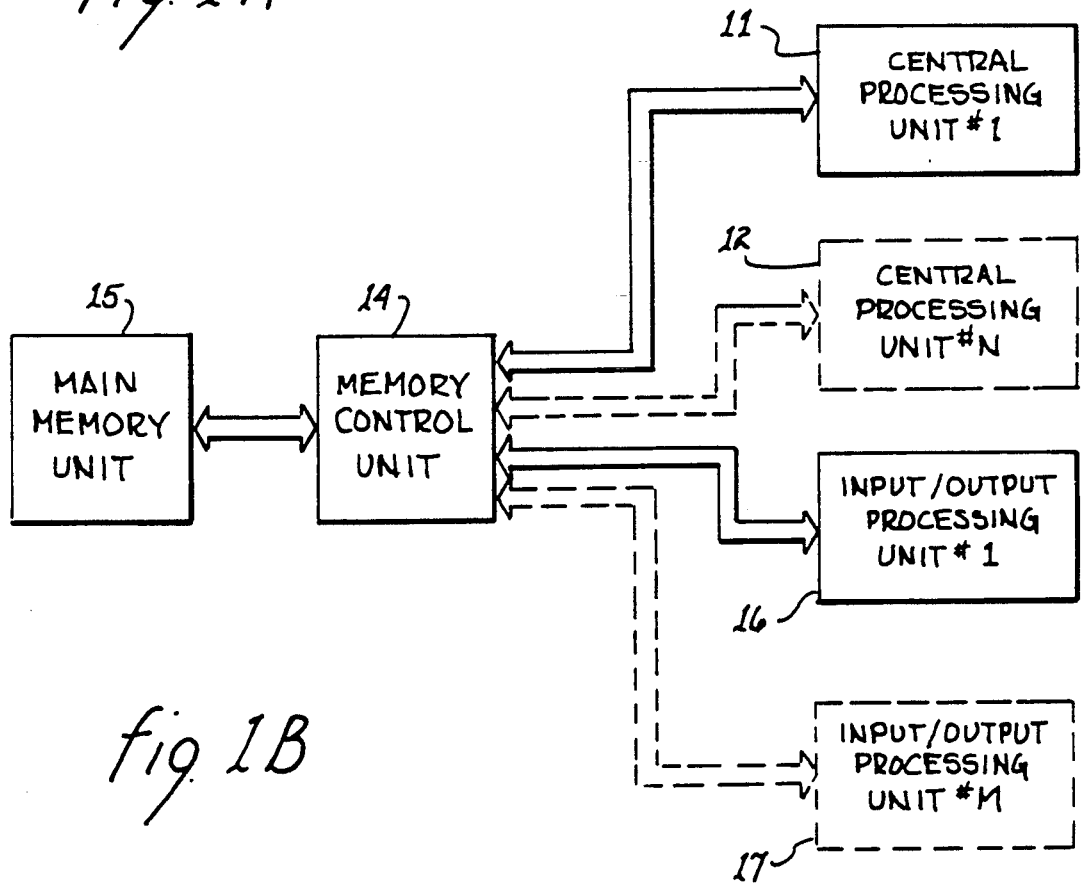

Referring now to FIG. 1A and FIG. 1B, two exemplary data processing system configurations capable of using the present invention are shown. In FIG. 1A, the central processing unit (#1) 11 is coupled to a system bus 19. Other central processing units (e.g., #N) 12 can also be coupled to the system. The central processing unit(s) 11 (through 12) process data according to the structure of the central processing unit(s) in conjunction with central processing unit control programs, the control programs being comprised of instructions resident in a main memory unit 15. The nonresident data and instructions are typically stored in one or more mass storage units (not shown) and are transferred to and from the main memory unit 15 via the system bus 19. Input/output unit(s) {#1} 16 (through (#M) 17) couple devices such as mass memory storage units, user terminal devices and communication devices to the data processing system by means of the system bus 19. The mass storage unit(s) store the data and instructions required by the data processing unit(s). Sets of data and-/or instructions, typically designated as pages of data and/or instructions, required for the operation of the central processing units 11 through 12, are transferred from the mass storage units, having relatively slow accessibility, to the main memory unit to which access by the central processing unit is relatively fast. The bus oriented system has an advantage in the relative ease to reconfigure the system but has the disadvantage that the each system component requires control apparatus to provide an interface with the system bus. Referring next to FIG. 1B, a data processing system is shown in which the central processing unit(s) 11 (through 12) and the input/output unit(s) 16 (through 17) are coupled to the main memory unit 15 through a memory control unit 14, the memory control unit 14 replacing the system bus 19 and the control function performed by individual data processing system components in the bus oriented data processing configuration shown in FIG. 1A. The memory control unit 14 provides a centralized control and monitoring of the transfer of data and instructions that can be more efficient than the bus oriented configuration of FIG. 1, but with the loss of flexibility.

Figure 2:
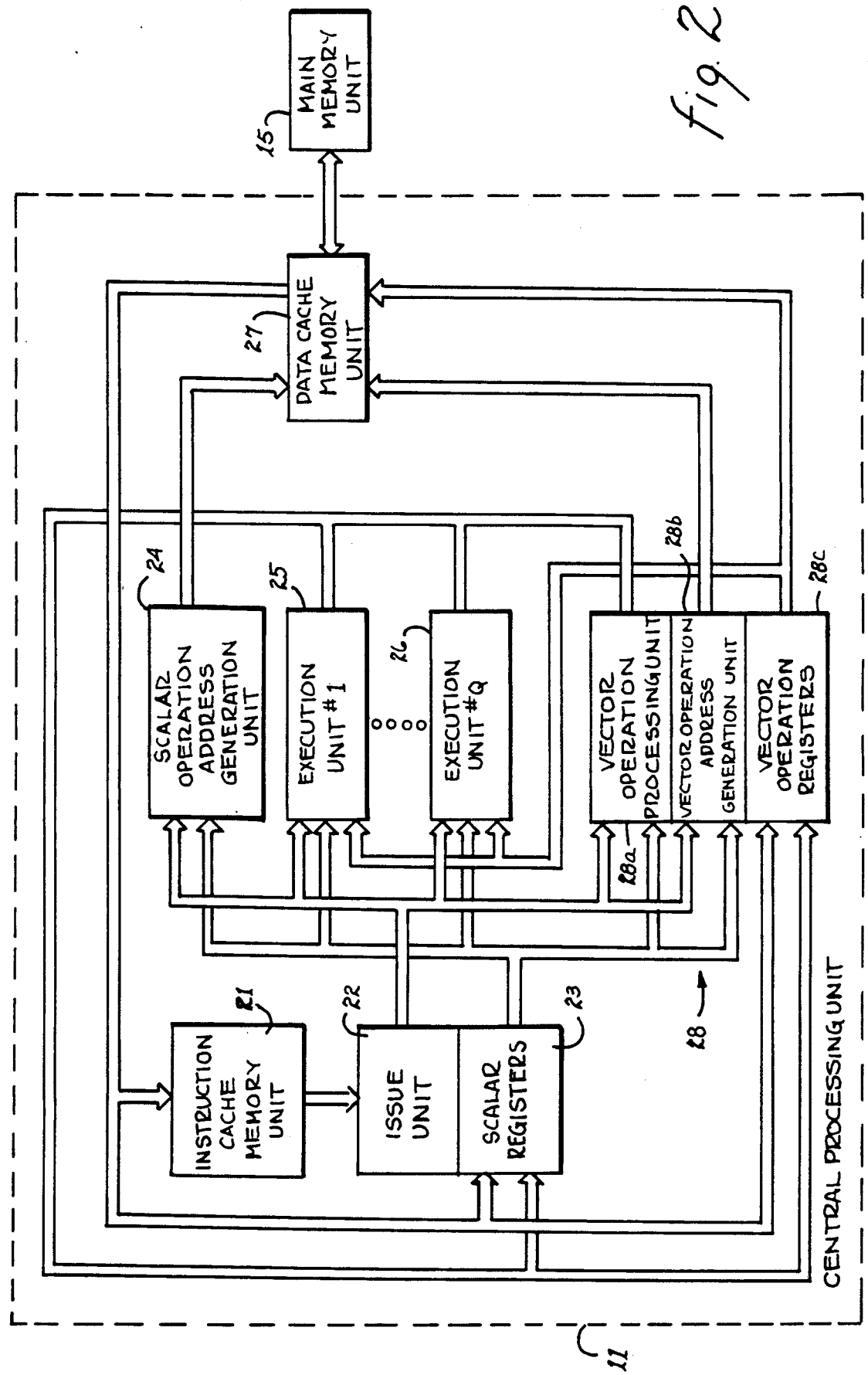
FIG. 2 is an example of a data processing unit of a data processing system capable of using the present invention.

Referring next to FIG. 2, a block diagram of an exemplary central processing unit capable of effective utilization of the present invention is illustrated. An issue unit 22 is responsible for providing (decoded) instructions to a plurality of specialized execution units comprising scalar operation address generation unit 24, at least one execution unit (#1) 25 (through execution unit {#Q} 26) and a vector operation unit 28, the vector operation unit 28 including vector operation processing unit 28A, vector operation address generation unit 28B and vector operation registers 28C. The data processed by the execution units are typically extracted from the scalar registers 23 or the vector registers 28C. The resulting data from the execution units are stored in the scalar registers 23, in the vector registers 28C or in a data cache memory unit 27. The data cache memory unit 27 can be viewed as a cache memory unit providing an interface between the main memory unit 15 and the central processing unit 11. (The data cache memory unit 27 is shown as being coupled directly to the main memory unit in FIG. 2. As illustrated in FIG. 1A and FIG. 1B, the actual coupling can include intervening data processing apparatus.) The issue unit 22 includes apparatus for determining which execution unit will process selected data and for determining when the selected execution unit is available for processing data. This latter feature includes ascertaining that the destination storage location will be available to store the processed data. The instruction cache memory unit 21 stores the instructions that are decoded and forwarded to the appropriate execution unit by the issue unit. The issue unit 22 has the apparatus to attempt to maximize the processing operations of the execution units. Thus, the issue unit 22 includes prefetch apparatus and algorithms to ensure that the appropriate instruction (including any branch instruction) is available to the issue unit 22 as needed. The plurality of execution units are, as indicated by the scalar operation address generation unit 24 and the vector operation unit 28, specialized processing devices for handling certain classes of processing operations. For example, an execution unit can be configured to handle floating point operations, or integer arithmetic operations, etc. Scalar registers 23 can store data required for the execution of the program or for providing a record of the data processing operation. For example, one register is the Program Counter register that stores the (virtual) address of the next instruction, in the executing program instruction sequence, to be processed. The scalar operation address generation unit 24 is used to convert virtual addresses to physical locations in the main memory unit 15. The issue unit 22 is also responsible for reordering the data from the execution units in the correct sequence when the execution units process instructions at different rates As noted above, the vector operation unit 28 includes a vector operation processing unit 28A, a vector operation address generation unit 28B and vector operation registers 28C. The activity of the vector operation processing unit can control the distribution of the data to the execution units 25 through 26 and the execution of the instructions therein. According to another embodiment (not shown), execution units dedicated to execution of instructions by the vector operation unit 28 can be available in the data processing system. When the execution units are available for both vector and scalar operations, control is subject to the overall system control of the issue unit 22 that allocates the resources of the data processing unit.

Figure 3:
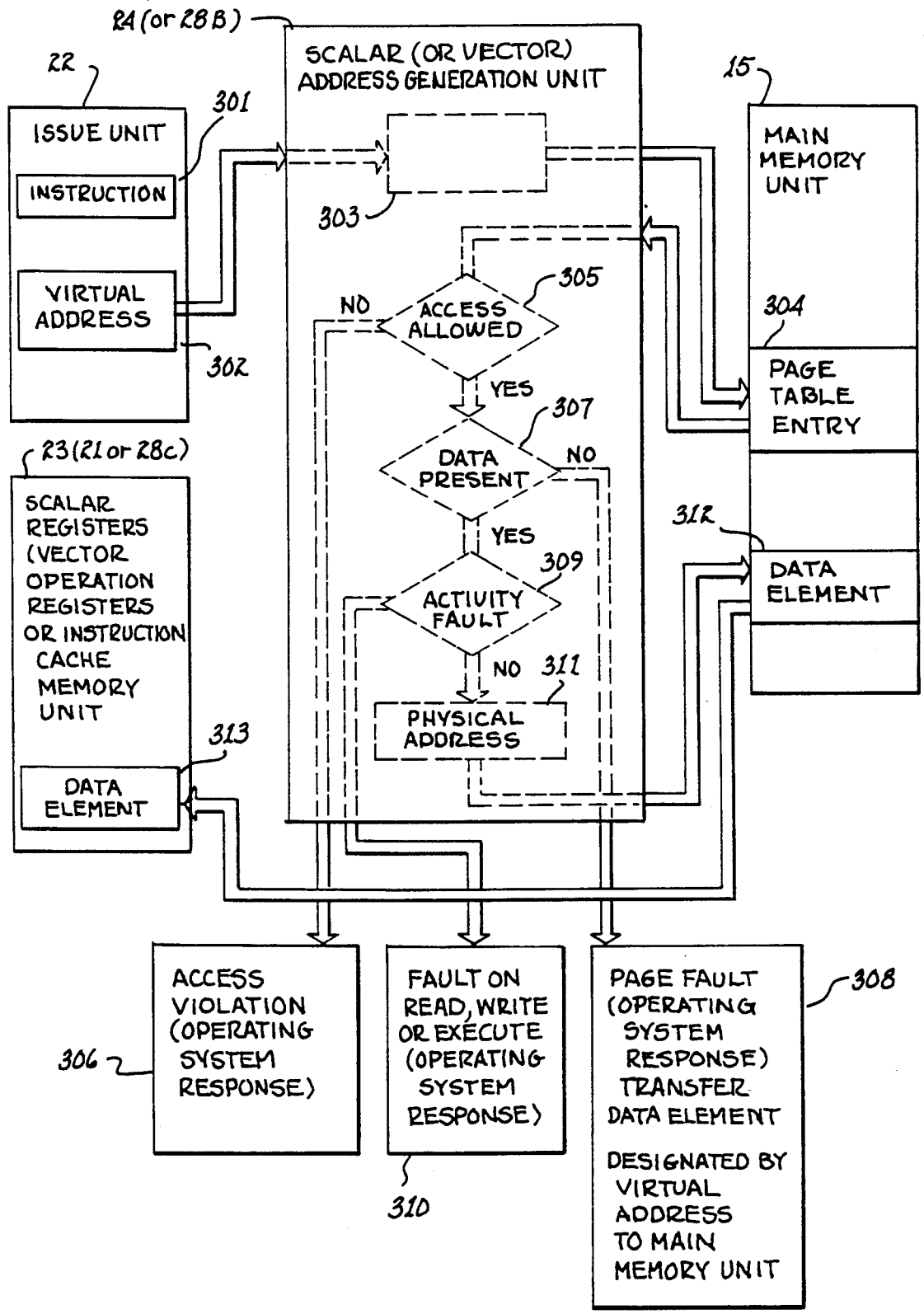
FIG. 3 illustrates the use of virtual memory in a data processing system.

Referring next to FIG. 3, a description of the virtual addressing mechanism of the preferred embodiment is illustrated. An instruction 301 in the issue unit has associated therewith a virtual address 302 identifying the data element upon which the operation of the instruction is to be performed. The issue unit transfers the virtual address 302 to scalar address generation unit 24 (or, where appropriate, the vector address generation unit 28B). In the address generation unit 24 (or 28B) a portion of the virtual address is used to identify (by apparatus 303 in the address generation unit) a page table entry 304 in main memory unit 15. The page table entry 304 is transferred to the address generation unit 24 (or 28B) and apparatus 305 tests selected fields in the page table entry to determine if access being attempted with respect to the data element is permitted. When the the access is not permitted, then an access violation 306 is identified and an appropriate operating procedure is invoked to determine how to respond to the access violation. When the test 305 determines that the access to data element 312 is permitted, then a test 307 is performed on page table entry 304 to determine if the data element required for the instruction is available in the main memory unit 15. When the test 307 indicates that the data element is not present, then a page fault 308 is generated and an operating system program transfers the data element to the main memory 15 (in location 312), updates the related page table entry 304 and communicates to the issue unit that retrieval from the main memory location of the required data element can be reinitiated. When the required data element is available in the main memory unit, as determined by test 307, then test 309 tests the page table entry 304 to determine if the activity for which the data element is required by the associated instruction is designated as resulting in a fault. When the activity determined by the instruction is designated as a fault condition, then a fault on read, a fault on write or a fault on execute as appropriate will invoke the operating system to respond to the fault condition (310). If the test 309 indicates that the activity of the instruction with respect the associated data element is not designated as a fault condition, then the address generation unit 24 (or 28B) determines the physical address 311 in the main memory unit 15 where the required data element is stored. The data element 312 at this address is transferred to a storage location 313 in the scalar registers 23, the vector operation registers 28C or to the instruction cache memory unit 21 (i.e., when the data element is an instruction). In this manner, the required data element, identified by a virtual address, is available for processing by the instruction 301.

Figure 4:
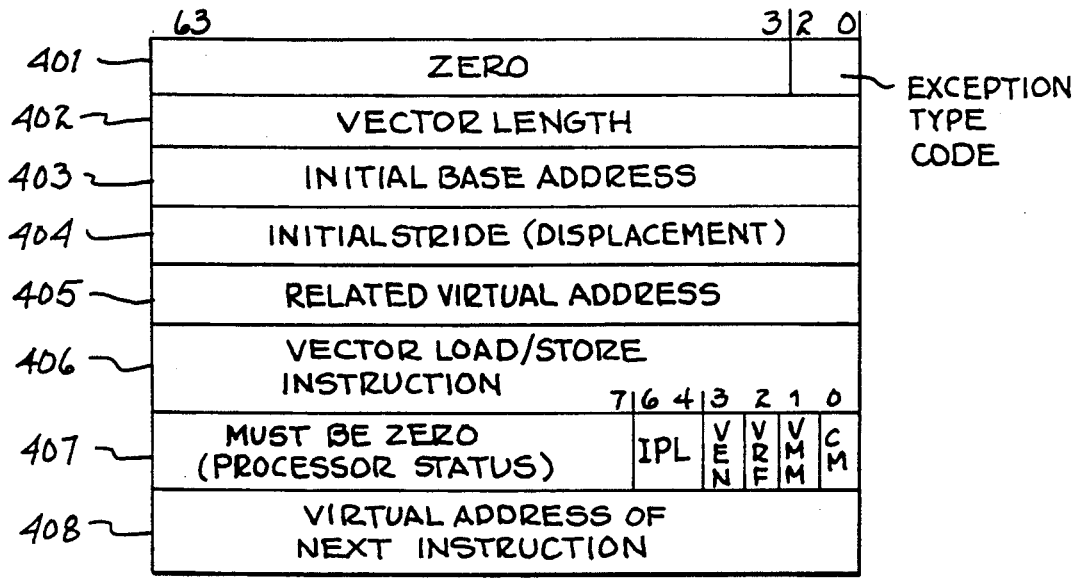
FIG. 4 is an example of a vector restart frame for recovery from a page fault according to the present invention.

Referring next to FIG. 4, a vector restart frame, according to the present invention, is illustrated. Signal group 401 includes all logic zeros except for bit positions 0-2. In these bit positions, the following types of exceptions are identified: an access violation, a fault on read, a fault on write, translation not valid, vector alignment and instruction pending. The instruction pending code group relates to vector load/store instructions that were issued by the issue unit, but for which the operation was not actually started. Signal group 402 designates the vector length or the number of data elements involved in the vector operation. Signal group 403 designates the initial base address. Signal group 404 indicates the initial stride or displacement between successive data elements. Signal group 405 is the related virtual address in the page of the missing data element causing the exception, while signal group 406 is the vector load/store instruction resulting in the exception. Signal group 407 is the processor status. For purposes of this invention, the field in bit position 2 (VRF) is particularly significant and indicates that a prior vector restart frame has been saved. Signal group 408 stores the virtual address of the next instruction.

Figure 5:
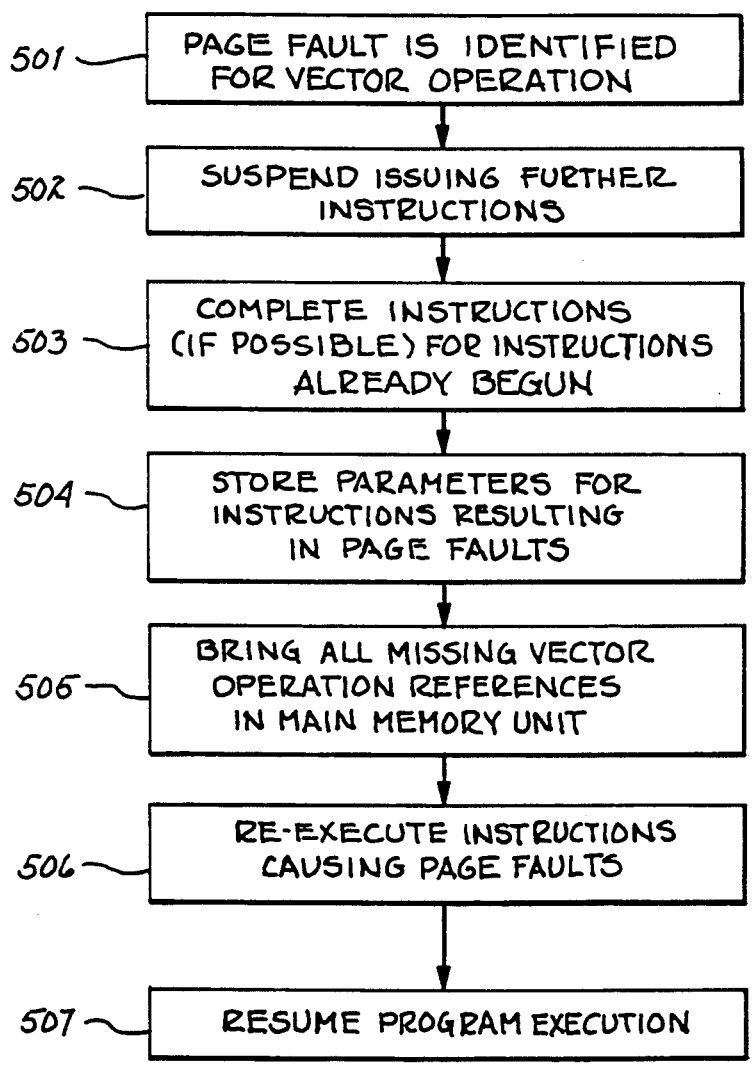
FIG. 5 in a flow diagram illustrating the operation of the present invention.

Referring next to FIG. 5, a flow diagram illustrating the recovery from a page fault for a data processing unit executing a vector operation is shown. In step 501, a page fault is identified during execution of a vector operation. The issue unit suspends the issuing of further instructions in step 502, but permits all the instructions in execution at the time of the page fault to be completed or to result in a page fault (or some other exceptional activity) in step 503 In step 504, parameters (such as shown in FIG. 4) are stored for each page fault in order to permit recovery from the page faults. In step 505, the pages missing to complete execution for each instruction resulting in a page fault is transferred to the main memory unit. Each instruction resulting in the fault is executed after the missing data are brought into the main memory unit (step 506). After all instructions showing page faults and all exceptional events have been responded to, the execution of the program is resumed (step 507).

2. Operation of the Preferred Embodiment

The central processing unit having pipelined execution units of FIG. 2 was implemented in the preferred embodiment subject to several constraints; however, other design implementations can utilize the present invention. The central processing unit includes a plurality of execution units, each execution unit adapted to execute a class of instructions. By way of example, one execution unit, the scalar address generating unit 24, controls the transfer of the logic signal groups between the central processing unit and the main memory unit, i.e., executes the scalar load/store instructions. One execution unit is adapted to execute data shifting operations, one execution unit for floating point add/subtract operations, one execution unit is adapted for integer and floating point multiply operations and one execution unit is adapted for integer and floating point divide operations. The specialized execution units can be, but are not necessarily implemented in a pipelined configuration. The other features of the central processing unit are the following. The instruction in the currently executing sequence of instructions is transferred to the issue unit 22 from the instruction cache memory unit 21. In the issue unit, the instruction is broken down into its constituent parts and data-dependent control signals and address signals are generated therefrom. However, before an instruction can begin execution (i.e., be issued), several constraints must be satisfied. All source and destination registers for the instruction must be available, i.e., no write operations to a needed register can be outstanding. The register write path must be available at the future cycle in which this instruction will store the processed quantity. The execution unit to be required for processing the instruction during the execution must be available to perform the operation. With respect to the vector operation unit, a vector operation reserves an execution unit for the duration of the vector operation. When a memory load/store instruction experiences a cache memory unit miss, the load/store unit busy flag will cause the subsequent load/store instructions to be delayed until the cache memory miss response is complete. When an instruction does issue, the destination register and the write path cycle for the result are reserved. During operand set-up, all instruction-independent register addresses are generated, operands are read and stored, and data-dependent control signals are generated. The instruction operands and control signals are passed to the associated execution unit for execution. The result generated by the execution unit is stored in the register files or in the data cache memory unit 15 as appropriate. Once an instruction issues, the result of the processing may not be available for several machine cycles. Meanwhile, in the next machine cycle, the next instruction can be decoded and can be issued when the requisite issue conditions are satisfied. Thus, the instructions are decoded and issued in the normal instruction sequence, but the results can be stored in a different order because of the varying instruction execution times of the execution units. This out of order storing complicates the exception handling and the retry of failing instructions. However, since these events are relatively rare, the out of order storing provides execution and hardware advantages With respect to FIG. 3, the use of virtual addressing techniques has been widely implemented. This technique permits the programmer not to be concerned with actual location of the data and instruction elements, the address generation mechanism providing an interface between the program addresses and the data and instruction elements within the data processing unit. By the use of pages of data and instruction elements, the transfer of data and instruction elements from the bulk or mass store media is expedited, there being no need to transfer individual data and instruction elements. In addition, programs are generally written in a format that stores data and instruction elements needed for sequential instruction execution relatively close together in the program or file. Thus, a page of data and instruction elements will typically include a multiplicity of related data and instruction elements for program execution. None-the-less, the relative rigidity of the granularity of the page implementation has the result, particularly in the vector instruction execution, that the group of related data and instruction elements can extend beyond the page boundary to a page not present in the main memory unit of the data processing system. In the preferred embodiment, the address generation mechanism 34 includes apparatus portions for address translation and for generating an exception (i.e., test 307) when the required page of information is not in the main memory unit 15 and includes a software program portion as part of the operating system for transferring pages of information between the bulk storage apparatus and the main memory unit. The address generation mechanism 34, when a page of data and instruction elements is transferred into the main memory unit 15, provides associated page table entries in main memory 15 wherein the the currently executing program can identify all the pages of data and instruction elements (associated with virtual addresses) stored in the main memory unit 15 and can therefore signal a page fault when the referenced data or instruction element is not in main memory unit 15. As shown in FIG. 3, the data processing unit typically includes procedures associated with the virtual addressing technique such as the apparatus for signaling that the required information page is not in the main memory unit as well as the programs for responding to a page fault by retrieving the missing page of information.

The recovery from vector page faults will typically be provided by a program under control of the operating system. This operating system program has available the vector restart frames to identify the program portions resulting in the page fault. Such a program will ensure that the data elements identified as being missing by the vector page fault are transferred to the main memory unit. The instruction, interrupted by the vector page fault, is completed. After all interrupted instructions are reexecuted, then the program can resume normal execution. In the present implementation of a vector operation, 64 data elements can be required, each possibly occurring in a different page. Therefore in addition, 64 page tables on separate pages can be required along with 1 page for the instruction. Therefore, the operating system software must make available the potentially large number of pages required for the execution of a vector instruction.

The central processing unit of the present invention is designed to provide parallel executions of vector instructions and scalar instructions. Therefore, when an exception or interrupt condition is detected, the instruction issuing procedure is stopped, and outstanding instructions completed. It will be clear that multiple exception and interrupt conditions can be present. In the preferred embodiment, the arithmetic traps have the highest priority, then the vector exceptions, then all other exceptions (faults) and finally the highest priority interrupt.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A digital data processing unit for connection to a main memory unit including a plurality of storage locations, each identified by a physical address, for storing vector operands and vector instructions, one type of said vector instructions being a computational instruction for initiating a computational operation, and another type of said vector instructions being a transfer vector instruction for initiating a transfer operation and identifying a virtual address, said digital data processing unit comprising:

A. a vector register for storing vector operands;
B. a vector execution unit for performing vector operations identified by vector instructions of the computational type in connection with vector operands in said vector register;
C. a vector address generating unit for performing, in response to receipt of an instruction of the transfer vector instruction type, an address translation operation to (1) generate a physical address in response to the virtual address identified by the transfer vector instruction corresponding to a physical address in said main memory unit, to enable a vector operand to be transferred between the storage location identified by said physical address and said vector register, and (2) generate a page fault indication if said virtual address identified by said transfer vector instruction does not correspond to a physical address in said main memory unit; and
D. an instruction issue unit for interactively retrieving vector instructions from said main memory unit and performing an instruction issue operation to transfer an instruction of said computational instruction type to said vector execution unit and to transfer an instruction of said transfer vector instruction type to said vector address generating unit to enable it to perform the address translation operation, said instruction issue unit being responsive to a page fault indication from said vector address generating unit resulting from one of said vector instructions to (1) terminate performing instruction issue operations while permitting said execution unit to continue to perform vector operations identified by other ones of said vector instructions that have already been issued and (2) generate restart information to identify the vector instruction which resulted in the page fault indication.

2. A digital data processing unit as defined in claim 1 wherein said main memory includes a page table entry corresponding to said virtual address, said vector address generating unit including means for retrieving said page table entry and means for testing said page table entry to determine whether said virtual address identified by said transfer vector instruction corresponds to a physical address in said main memory unit.

3. A digital data processing unit as defined in claim 2 wherein said page table entry includes access rights information, said vector address generating unit including means for testing said access rights information to determine whether access to the virtual address identified by said page table entry is permitted and for initiating a predetermined operation if it is not.

4. A digital data processing unit as defined in claim 2 wherein said page table entry includes operational rights information, said vector address generating unit including means for testing said operational rights information to determine whether a predetermined operation may be performed in connection with information identified by the virtual address identified by said page table entry and for initiating a predetermined operation if it is not.

5. A digital data processing unit as defined in claim 1 further comprising a program module for enabling establishment in said main memory of a physical address corresponding to the virtual address which gave rise to said page fault indication, and a faulted instruction processing program module for enabling use of said restart information to process the vector instruction which resulted in the page fault indication using the established physical address.

6. A digital data processing unit as defined in claim 5 wherein said instruction issue unit establishes said restart information in the form of a restart information frame on a kernel stack the faulted instruction processing program module enabling processing of the restart information frame on said kernel stack.

7. A digital data processing unit as defined in claim 6 in which said instruction issue unit establishes in said restart information frame an indicator indicting whether it had established a previous restart information frame on said kernel stack, the faulted instruction process program module using the indicator to enable processing of said previous restart information frame.

8. A digital data processing unit as defined in claim 1 wherein said main memory unit further stores, in said storage locations, scalar operands and scalar instructions, one type of said scalar instructions being a computational instruction for initiating a computational operation, and another type of said scalar instructions being a transfer scalar instruction for initiating a transfer operation and identifying a second virtual address, said digital data processing unit further including:
A. a scalar register for storing a scalar operand;
B. a scalar execution unit for performing scalar operations identified by a scalar instruction of the computational type in connection with scalar operands in said scalar register;
c. a scalar address generating unit for performing, in response to receipt of an instruction of the transfer scalar instruction type, a scalar address translation operation to (1) generate a second physical address in response to the second virtual address identified by the transfer scalar instruction corresponding to a physical address in said main memory unit, to enable a scalar operand to be transferred between the storage location identified by said second physical address and said scalar register, and (2) generate a second page fault indication if said second virtual address identified by said transfer scalar instruction does not correspond to a physical address in said main memory unit; and
D. wherein said instruction issue unit iteratively retrieves scalar instruction from said main memory unit and performs a scalar instruction issue operation to transfer a scalar instruction of said computational instruction type to said scalar execution unit and to transfer an instruction of said transfer scalar instruction type to said scalar address generating unit to enable it to perform the scalar address translation operation, said instruction issue unit being responsive to a second page fault indication from said scalar address generating unit to terminate performing instruction issue operations and to generate scalar restart information to identify the scalar instruction which resulted in the second page fault indication from said scalar address generating unit.

9. A digital data processing unit as defined in claim 8 wherein said main memory includes a page table entry corresponding to said second virtual address, said scalar address generating unit including means for retrieving said page table entry and means for testing said page table entry to determine whether said second virtual address identified by said transfer scalar instruction corresponds to a physical address in said main memory unit.

10. A digital data processing unit as defined in claim 9 wherein said page table entry includes access rights information, and scalar address generating unit including means for testing said access rights information to determine whether access to the second virtual address identified by said page table entry is permitted and for initiating a predetermined operation if it is not.

11. A digital data processing unit as defined in claim 9 wherein said page table entry includes operational rights information, said scalar address generating unit including means for testing said operational rights information to determine whether a predetermined operation may be performed in connection with information identified by the second virtual address identified by said page table entry and for initiating a predetermined operation if it is not.

12. A digital data processing unit as defined in claim 8 further comprising a program module for enabling establishment in said main memory of a physical address corresponding to the virtual address which gave rise to said second page fault indication, and a faulted instruction processing program module for enabling use of said scalar restart information to process the scalar instruction which resulted in the second page fault indication using the established physical address corresponding to the virtual address which gave rise to said second page fault indication.

13. A digital data processing unit as defined in claim 12 wherein said instruction issue unit establishes said scalar restart information in the form of a restart information frame on a kernel stack, the faulted instruction processing program module enabling processing of the scalar restart information frame on said kernel stack.

14. A digital data processing unit as defined in claim 13 in which said instruction issue unit establishes in said restart information frame an indicator indicating whether it had established a previous restart information frame on said kernel stack, the faulted instruction processing program module using the indicator to enable processing of said previous restart information frame.

15. A method of operating a digital data processing unit connected to a main memory unit including a plurality of storage locations, each identified by a physical address, for storing vector operands and vector instructions, one type of said vector instructions being a computational instruction for initiating a computational operation, and another type of said vector instructions being a transfer vector instruction for initiating a transfer operation and identifying a virtual address, said method comprising the steps of:
A. iteratively retrieving vector instructions from said main memory unit and performing an instruction issue operation to transfer an instruction of said computational instruction type to a vector execution unit for processing and to a vector address generating unit if the instruction is of the transfer vector instruction type;

B. enabling said vector address generating unit to perform, in response to receipt of an instruction of the transfer vector instruction type, an address translation operation to (1) generate a physical address in response to the virtual address identified by the transfer vector instruction corresponding to a physical address in said main memory unit, to enable a vector operand to be transferred between the storage location identified by said physical address and said vector register, and (2) generate a page fault indication if said virtual address identified by said transfer vector instruction does not correspond to a physical address in said main memory unit;

C. responding to a page fault indication from said vector address generating unit resulting from one of said vector instructions by (1) terminating performing instruction issue operations while permitting said execution unit to continue to perform vector operations identified by other ones of said vector instructions that have already been issued, and (2) generating restart information to identify the vector instruction which resulted in the page fault indication;

D. establishing in said main memory a physical address corresponding to the virtual address which gave rise to said page fault indication, and E. using said restart information to process the vector instruction which resulted in the page fault indication using the established physical address.

16. A method as defined in claim 15 in which said restart information includes an indicator that restart information had been previously generated, the using step including the step of using the indicator to enable the unit to locate and process said previous restart information.

17. A digital data processing system including a digital data processing unit connected to a main memory unit including a plurality of storage locations, each identified by a physical address, for storing vector operands and vector instructions one type of said vector instructions being a computational instruction for initiating a computational operation, and another type of said vector instructions being a transfer vector instruction for initiating a transfer operation and identifying a virtual address, said digital data processing unit comprising:

A. a vector register for storing vector operands;

B. a vector execution unit for performing vector operations identified by vector instructions of the computational type in connection with vector operands in said vector register;

C. a vector address generating unit for performing, in response to receipt of an instruction of the transfer vector instruction type, and address translation operation to (1) generate a physical address in response to the virtual address identified by the transfer vector instruction corresponding to a physical address in said main memory unit, to enable a vector operand to be transferred between the storage location identified by said physical address and said vector register, and (2) generate a page fault indication if said virtual address identified by said transfer vector instruction does not correspond to a physical address in said main memory unit; and D. an instruction issue unit for iteratively retrieving vector instructions from said main memory unit and performing an instruction issue operation to transfer an instruction of said computational instruction type to said vector execution unit and to transfer an instruction of said transfer vector instruction type to said vector address generating unit to enable it to perform the address translation operation, said instruction issue unit being response ti a page fault indication from said vector address generating unit resulting from one of said vector instruction to (1) terminate performing instruction issue operations while permitting said execution unit to continue to perform vector operations identified by other ones of said vector instructions that have already been issued and (2) generate restart information to identify the vector instruction which resulted in the page fault indication.

18. A digital data processing system as defined in claim 17 wherein said main memory includes a page table entry corresponding to said virtual address, said vector address generating unit including means for retrieving said page table entry and means for testing and page table entry to determine whether said virtual address identified by said transfer vector instruction corresponds to a physical address in said main memory unit.

19. A digital data processing system as defined in claim 18 wherein said page table entry includes access rights information, said vector address generating unit including means for testing said access rights information to determine whether access to the virtual address identified by said page table entry is permitted and for initiating a predetermined operation if it is not.

20. A digital data processing system as defined in claim 18 wherein said page table entry includes operational rights information, said vector address generating unit including means for testing said operational rights information to determine whether a predetermined operation may be performed in connection with information identified by the virtual address identified by said page table entry and for initiating a predetermined operation if it is not.

21. A digital data processing system as defined in claim 17 further comprising a program module for enabling establishment in said main memory of a physical address corresponding to the virtual address which gave rise to said page fault indication, and a faulted instruction processing program module for enabling use of said restart information to process the vector instruction which resulted in the page fault indication using the established physical address.

22. A digital data processing system as defined in claim 21 wherein said instruction issue unit establishes said restart information in the form of a restart information frame on a kernel stack, the faulted instruction processing program module enabling processing of the restart information frame on said kernel stack.

23. A digital data processing system as defined in claim 22 in which said instruction issue unit establishes in said restart information frame an indicator indicating whether it had established a previous restart information frame on said kernel stack, the faulted instruction process program module using the indicator to enable processing of said previous restart information frame.

24. A digital data processing system as defined in claim 17 wherein said main memory unit further stores, in said storage locations, scalar operands and scalar instructions, one type of said scalar instructions being a computational instruction for initiating a computational operation, and another type of said scalar instructions being a transfer scalar instruction for initiating a transfer operation and identifying a second virtual address, said digital data processing unit further including:

A. a scalar register for storing a scalar operand;

B. a scalar execution unit for performing scalar operations identified by a scalar instruction of the computational type in connection with scalar operands in said scalar register;

C. a scalar address generating unit for performing, in response to receipt of an instruction of the transfer scalar instruction type, a scalar address translation operation to (1) generate a second physical address in response to the second virtual address identified by the transfer scalar instruction corresponding to a physical address in said main memory unit, to enable a scalar operand to be transferred between the storage location identified by said second physical address and said scalar register, and (2) generate a second page fault indication if said second virtual address identified by said transfer scalar instruction does not correspond to a physical address in said main memory unit; and D. wherein said instruction issue unit iteratively retrieves scalar instructions from said main memory unit and performs a scalar instruction issue operation to transfer a scalar instruction of said computational instruction type to said scalar execution unit and to transfer an instruction of said transfer scalar instruction type to said scalar address generating unit to enable it to perform the scalar address translation operation, said instruction issue unit being responsive to a second page fault indication from said scalar address generating unit to terminate performing instruction issue operations and to generate scalar restart information to identify the scalar instruction which resulted in the second page fault indication from said scalar address generating unit.

25. A digital data processing system as defined in claim 24 wherein said main memory includes a page table entry corresponding to said second virtual address, said scalar address generating unit including means for retrieving said page table entry and means for testing said page table entry to determine whether said second virtual address identified by said transfer scalar instruction corresponds to a physical address in said main memory unit.

26. A digital data processing system as defined in claim 25 wherein said page table entry includes access rights information, said scalar address generating unit including means for testing said access rights information to determine whether access to the second virtual address identified by said page table entry is permitted and for initiating a predetermined operation if it is not.

27. A digital data processing system as defined in claim 25 wherein said page table entry includes operational rights information, said scalar address generating unit including means for testing said operational rights information to determine whether a predetermined operation may be performed in connection with information identified by the second virtual address identified by said page table entry and for initiating a predetermined operation if it is not.

28. A digital data processing system as defined in claim 24 further comprising a program module for enabling establishment in said main memory of a physical address corresponding to the virtual address which gave rise to said second page fault indication, and a faulted instruction processing program module for enabling use of said scalar restart information to process the scalar instruction which resulted in the second page fault indication using the established physical address corresponding to the virtual address which gave rise to said second page fault indication.

29. A digital data processing system as defined in claim 28 wherein said instruction issue unit establishes said scalar restart information in the form of a restart information frame on a kernel stack, the faulted instruction processing program module enabling processing of the scalar restart information frame on said kernel stack.

30. A digital data processing system as defined in claim 24 in which said instruction issue unit establishes in said restart information frame an indicator indicating whether it had established a previous restart information frame on said kernel stack, the faulted instruction processing program module using the indicator to enable processing of said previous restart information frame.

31. A digital data processing unit for connection to a main memory unit including a plurality of storage locations, each identified by a physical address, for storing vector operands and vector instructions, one type of said vector instructions being a computational instruction for initiating a computational operation, and another type of said vector instructions being a transfer vector instruction for initiating a transfer operation and identifying a virtual address, said main memory unit further including a page table entry corresponding to said virtual address, said page table entry including access rights information and operational rights information, said digital data processing unit comprising:

A. a vector register for storing vector operands;

B. a vector execution unit for performing vector operations identified by vector instructions of the computational type in connection with vector operands in said vector register;

C. a vector address generating unit including:

i. means responsive to receipt of an instruction of the transfer vector instruction type, for retrieving said page table entry;

ii. page fault test means for using the retrieved page table entry to determine whether said virtual address identified by said transfer vector instruction corresponds to a physical address in said main memory unit, and for generating a page fault indication if said virtual address identified by said transfer vector instruction does not correspond to a physical address in said main memory unit;

iii. access rights test means for testing the access rights information in the retrieved page table entry to determine whether access to the virtual address identified by said page table entry is permitted and for initiating a predetermined operation if it is not;

iv. operational rights test means for testing the operational rights information in the retrieved page table entry to determine whether a predetermined operation may be performed in connection with information identified by the virtual address identified by said page table entry and for initiating a predetermined operation if it is not; and v. means for performing an address translation operation to generate a physical address in response to the virtual address identified by the transfer vector instruction corresponding to a physical address in said main memory unit, to enable a vector operand to be transferred between the storage location identified by said physical address and said vector register, if said page fault test means determines that the virtual address corresponds to a physical address in said main memory unit, said access rights test mean determines that the access to the virtual address is permitted, and said operational rights test means determines that the predetermined operation may be performed; and D. an instruction issue unit for iteratively retrieving vector instructions form said main memory unit and performing an instruction issue operation to transfer an instruction of said computational instruction type to said vector execution unit and to transfer an instruction of said transfer vector instruction type to said vector address generating unit to enable it to perform the address translation operation, said instruction issue unit being responsive to a page fault indication from said vector address generating unit resulting from one of said vector instructions to (1) terminate performing instruction issue operations while permitting said execution unit to continue to perform vector operations identified by other ones of said vector instructions that have already been issued, and (2) generate a restart information frame on a kernel stack, to identify the vector instruction which resulted in the page fault indication, said restart information frame including an indicator indicating whether it had established a previous restart information frame on said kernel stack;

E. a program module for enabling establishment in said main memory of a physical address corresponding to the virtual address which gave rise to said page fault indication; and F. a faulted instruction processing program module enabling processing of the restart information frame on said kernel stack, the faulted instruction process program module using the indicator to enable processing of said previous restart information frame.

32. A digital data processing unit for connection to a main memory unit including a plurality of storage locations, each identified by a physical address, for storing (i) vector operands an vector instructions one type of said vector instructions being a computational instruction for initiating a computational operation, and another type of said vector instructions being a transfer vector instruction for initiating a transfer operation and identifying a virtual address, and (ii) scalar operands and scalar instructions one type of said scalar instructions being a second computational instruction for initiating a second computational operation, and another type of said scalar instructions being a transfer scalar instruction for initiating a scalar transfer operation and identifying a second virtual address, aid main memory unit further including a page table entry corresponding to each of said virtual addresses, each said page table entry including access rights information and operational rights information, said digital data processing unit comprising:

A. a vector register for storing vector operands;

B. a vector execution unit for performing vector operations identified by vector instructions of the computational type in connection with vector operands in said vector register;

C. a scalar register for storing scalar operands;

D. a scalar execution unit for performing scalar operations identified by a scalar instruction of the computational type in connection with scalar operands in said scalar register;

E. a vector address generating unit including:

i. vector page table entry retrieving means responsive to receipt of an instruction of the transfer vector instruction type, for retrieving a said page table entry;

ii. vector page fault rest means for using a retrieved page table entry to determine whether a virtual address identified by said received transfer vector instruction corresponds to a physical address in said main memory unit, and for generating a page fault indication if said virtual address identified by said received transfer vector instruction does not correspond to a physical address in said main memory unit;

iii. vector access rights test means for testing the access rights information in the retrieved page table entry to determine whether access to the virtual address identified by said retrieved page table entry is permitted and for initiating a predetermined operation if it is not;

iv. vector operational rights test means for testing the operational rights information in the retrieved page table entry to determine whether a predetermined operation may be performed in connection with information identified by the virtual address identified by said retrieved page table entry and for initiating a predetermined operation if it is not; and v. vector address translation means for performing an address translation operations to generate a physical address in response to the virtual address identified by the transfer vector instruction corresponding to a physical address in said main memory unit, to enable a vector operand to be transferred between the storage location identified by said generated physical address and said vector register, if said vector page fault test means determines that the virtual address identified by the transfer vector instruction corresponds to a physical address in said main memory unit, said vector access rights test means determines that the access to the virtual address identified by the transfer vector instruction is permitted, and said vector operational rights test mean determines that the predetermined operation may be performed;

F. a scalar address generating unit including:

i. scalar page table entry retrieval means responsive to receipt of an instruction of the transfer scalar instruction type, for retrieving a second said page table entry;

ii. scalar page fault test means for using the second retrieved page table entry to determine whether said virtual address identified by said transfer scalar instruction corresponds to a physical address in said main memory unit, and for generating a page fault indication if said virtual address identified by said transfer scalar instruction does not correspond to a physical address in said main memory unit, iii. scalar access rights test means for testing the access rights information in the second retrieved page table entry to determine whether access to the virtual address identified by said second retrieved page table entry is permitted and for initiating a predetermined operation if it is not;

iv. scalar operational rights test means for testing the operational rights information in the second retrieved page table entry to determine whether a predetermined operation may be performed in connection with information identified by the virtual address identified by said second retrieved page table entry and for initiating a second predetermined operation if it is not; and v. scalar address translation means for performing an address translation operation to generate a second physical address in response to the virtual address identified by the transfer scalar instruction corresponding to a physical address in said main memory unit, to enable a scalar operand to be transferred between the storage location identified by said second generated physical address and said scalar register, if said scalar page fault test means determines that the virtual address identified by the transfer scalar instruction corresponds to a physical address in said main memory unit, said scalar access rights test means determines that the access to the virtual address identified by the transfer scalar instruction is permitted, and said scalar operational rights test means determines that the second predetermined operation may be performed;

G. an instruction issue unit for iteratively retrieving vector and scalar instructions from said main memory unit and performing an instruction issue operation to transfer (i) a vector instruction of said computational instruction type to said vector execution unit, (ii) a vector instruction of said transfer vector instruction type to said vector address generating unit to enable it to perform an address translation operation, (iii) a scalar instruction of said computational instruction type to said scalar execution unit, and (iv) a scalar instruction of said transfer scalar instruction type to said scalar address generating unit to enable it to perform an address translation operation, said instruction issue unit being responsive to a page fault indication from said vector address generating unit resulting from one of said vector instructions to (1) terminate performing instruction issue operations while permitting said execution unit to continue to perform vector operations identified by other ones of said vector instructions that have already been issued and (2) generate a restart information frame on a kernel stack, to identify the vector instruction which resulted in the page fault indication, said restart information frame including an indicator indicating whether it had established a previous restart information frame on said kernel stack;

H. a program module for enabling the establishment in said main memory of a physical address corresponding to a virtual address which gave rise to a page fault indication; and I. a faulted instruction processing program module enabling processing of a restart information frame on said kernel stack, the faulted instruction process program module using the indicator to enable processing of a said previous restart information frame.

* * * * *

UNITED STATES PATENT AND TRADEMARK OFFICE
CERTIFICATE OF CORRECTION

PATENT NO. : 5,063,497

DATED : November 5, 1991

INVENTOR(S) : Cutler et al.

It is certified that error appears in the above-identified patent and that said Letters Patent is hereby corrected as shown below:

Col. 2, line 29, after "virtual", delete "of the"; insert --of the-- after "memory".

Col. 4, line 33, replace "net" with --not--.

Col. 6, line 18, insert --.-- after "rates".

Col. 7, line 48, insert --.-- after "503".

Col. 14, lines 9 and 10, replace "response ti" with --responsive to--.

Signed and Sealed this

Seventh Day of September, 1993

Attest:

BRUCE LEHMAN

Attesting Officer

Commissioner of Patents and Trademarks